United States Patent [19]

Thylefors

[11] 3,873,061

[45] Mar. 25, 1975

[54] DEVICE FOR TRANSFERRING FLUIDS BETWEEN STATIONARY AND ROTARY PARTS

[75] Inventor: Henric Wilhelm Thylefors, Stockholm, Sweden

[73] Assignee: Alfa-Laval AB, Tumba, Sweden

[22] Filed: Apr. 17, 1974

[21] Appl. No.: 461,726

[30] Foreign Application Priority Data
May 29, 1973 Sweden.............................. 7307558

[52] U.S. Cl................. 251/139, 251/141, 137/580, 233/46
[51] Int. Cl............................................ F16k 31/06
[58] Field of Search ............ 137/580; 251/139, 141, 251/129; 233/46, 47

[56] References Cited
UNITED STATES PATENTS
2,534,268  12/1950  Kahn et al. ..................... 251/129 X
2,921,969  1/1960  Loy.................................. 233/46 X Primary Examiner—Arnold Rosenthal
Attorney, Agent, or Firm—Cyrus S. Hapgood

[57] ABSTRACT

A stationary part has a conduit for supplying fluid to a passage located in a rotary part on the rotation axis thereof, the supply conduit having a valve seat. A body comprising a magnetizable material has a fluid-transferring channel coaxial with the rotation axis and includes a valve element; and an electromagnet is operable on this body to hold the valve element against the seat to close the supply conduit against the fluid pressure therein. Upon deenergizing of the electromagnet, the fluid pressure in the supply conduit displaces said body axially so as to unseat the valve element and engage the body with the rotating part, whereby the passage therein is supplied with fluid through said channel in the body.

2 Claims, 1 Drawing Figure

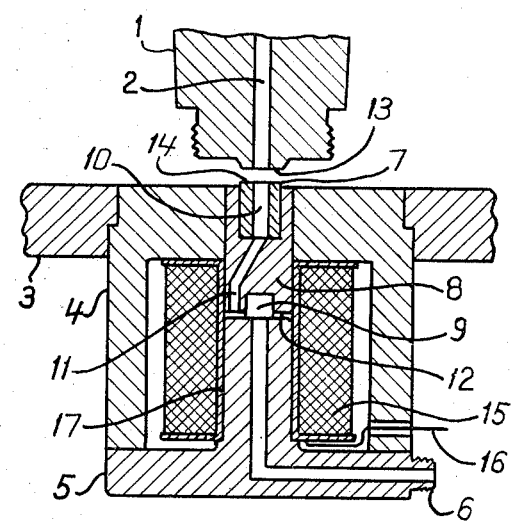

DEVICE FOR TRANSFERRING FLUIDS BETWEEN STATIONARY AND ROTARY PARTS

The present invention relates to a device for transferring a fluid (gas or liquid) by means of a pressure drop between a stationary and a rotating machine part, in which device a body provided with a fluid-transferring channel, coaxial with the axis of rotation, is movable axially and urged against one of said machine parts by the fluid pressure.

In devices of this kind, the interengaging surfaces of the stationary and rotating machine parts are subjected to strong wearing, which, of course, is a disadvantage. In devices such as centrifugal separators with means for effecting total or partial discharge of the content of the centrifuge rotor, the fluid-transferring channel must be in operation only temporarily, as during very short periods of time. In such devices, the fluid supply is controlled by means of valves inserted in the fluid supply conduit. In addition to the disadvantage that said interengaging surfaces are subjected to wearing as long as the centrifuge rotor is rotating, the operating system also suffers from a certain reaction inertia, in that a relatively long supply channel for the operating fluid must be filled and discharged. This is especially true when the operating fluid is a gas.

An object of the present invention is to eliminate these two disadvantages.

The invention is characterized in that said body comprises a magnetizable material and that a part integral with this body is designed as a valve element arranged to cooperate with a valve seat provided in the fluid supply conduit, said body being arranged to be actuated electromagnetically at suitable time periods so that the valve element is kept lying against the valve seat against the action of the fluid pressure. Consequently, with this arrangement the advantage is gained that the interengaging surfaces are in contact with each other only during the moments when a fluid transfer takes place; and due to the proximity of the valve to the same surfaces, the flow path of the fluid between the valve and said surfaces is shortened, resulting in a corresponding increase of the reaction rapidity of the operating system.

The invention is explained more in detail below, reference being made to the accompanying drawing in which the single illustration is an axial sectional view of an embodiment, chosen by way of example, of the present device.

In the drawing, 1 designates an axial spindle of a centrifugal separator bowl mounted for rotation about a vertical axis, the spindle having a central, axial channel 2 for supplying an operating gas, such as compressed air, to the centrifuge rotor during short periods. A part of the separator frame is shown at 3. In this stationary part 3 is an insert consisting of two parts 4 and 5. In the part 5 is an inlet 6 for said operating gas. In the part 4 is an axially movable insert consisting of cylindrical parts 7, 8 and 9, and these three parts being firmly fixed to each other. The part 7 has a channel 10 which is coaxial with the channel 2 and communicates through a channel 11 with a clearance 12 between the parts 5 and 8. The part (pad) 9, which preferably consists of a plastic, closes inlet 6 in the shown position of part 9. When operating gas is supplied to the channel 2 of the centrifuge rotor, surfaces 13 and 14 on the spindle 1 and the part 7, respectively, are caused to lie against each other. The insert 7, 8, 9 is arranged to be actuated magnetically in that the parts 4, 5 and 8 are made of easily magnetizable material and a magnet winding 15 is arranged to surround the part 8 annularly. The magnetic winding is supplied with an electric current through a wire 16. A cylindrical sleeve 17, which is made of a non-magnetic material, seals the slot 12 against leakage of gas.

In the position shown in the drawing, current is supplied to the electromagnet 4, 5, 15, which consequently attracts the insert 7, 8, 9, so that the pad 9 is kept pressed against the opening of the inlet 6 and effects a reliable closing of the latter. A permanent superatmospheric pressure of air prevails in the inlet 6. In the illustrated position, the surfaces 13 and 14 do not contact each other, whereby wearing of them is avoided. During the short moment when operating gas is to be supplied to the channel 2, the current supply to the electromagnetic 4, 5, 15 is interrupted. The air pressure in the inlet 6 then presses the insert 7, 8, 9 upwards so that the latter will lie against the rotating surface 13, and compressed air from the inlet 6 then flows through the slot 12 and the channels 11 and 10 into the channel 2. When current is again supplied to the magnet 4, 5, 15, the insert 7, 8, 9 is pulled downwnard by the magnet so that the pad 9 closes the inlet 6. Compressed air present in the centrifuge rotor and its channel 2 then blows out through the lower opening of the channel 2.

According to the invention, if a liquid is supplied to a rotating machine part such as the centrifuge spindle 1, the liquid is subjected to centrifugal force and can only be drained away through the channel 2 in the degree determined by the radius of the cross-section of the channel. Liquid in addition to this must be discharged by other methods known in the centrifugal art.

I claim:

1. In combination with a rotating machine part having a fluid passage coaxial with the rotation axis of said part, a stationary part having a fluid supply conduit and a valve seat in said conduit, a body having a fluid-transferring channel coaxial with said rotation axis and comprising a magnetizable material, said body including a valve element integral with said body and coacting with said valve seat, said body being movable axially in one direction to disengage said valve element from the valve seat and engage said body with the rotating part to connect the supply conduit through said channel to said fluid passage, said body being movable axially in the opposite direction to disengage the body from the rotating part and engage said valve element with the valve seat to close said supply conduit, and an electromagnet associated with said body and operable to hold the valve element against said seat against the action of the fluid pressure in said conduit.

2. The combination of claim 1, in which said stationary part includes a portion coaxial with rotation axis, the electromagnet including a magnet winding surrounding said stationary portion and part of said movable body.

* * * * *